(12) United States Patent
Witzgall

(10) Patent No.: US 9,007,262 B1
(45) Date of Patent: Apr. 14, 2015

(54) DIVERSIFIED DOPPLER FOR SINGLE PLATFORM GEOLOCATION

(75) Inventor: Hanna E. Witzgall, Chantilly, VA (US)

(73) Assignee: Leidos, Inc., Reston, VA (US)

(*) Notice: Subject to any disclaimer, the term of this patent is extended or adjusted under 35 U.S.C. 154(b) by 403 days.

(21) Appl. No.: 13/479,573

(22) Filed: May 24, 2012

Related U.S. Application Data

(60) Provisional application No. 61/519,597, filed on May 25, 2011, provisional application No. 61/489,953, filed on May 25, 2011.

(51) Int. Cl.
*G01S 5/10* (2006.01)

(52) U.S. Cl.
CPC ........................................ *G01S 5/10* (2013.01)

(58) Field of Classification Search
USPC ............................ 342/357.78, 357.77, 357.75
See application file for complete search history.

(56) References Cited

U.S. PATENT DOCUMENTS

| | | | |
|---|---|---|---|
| 5,526,001 A | | 6/1996 | Rose et al. |
| 6,876,859 B2* | | 4/2005 | Anderson et al. .......... 455/456.1 |
| 7,592,909 B2* | | 9/2009 | Zaruba et al. ............ 340/539.13 |
| 8,044,859 B2 | | 10/2011 | Lommen et al. |
| 8,174,444 B2 | | 5/2012 | Parker |
| 8,305,265 B2 | | 11/2012 | Ezal et al. |
| 8,462,044 B1 | | 6/2013 | Ho et al. |
| 2005/0035900 A1* | | 2/2005 | Zaugg et al. ..................... 342/95 |
| 2006/0256894 A1* | | 11/2006 | Kim ................................. 375/326 |
| 2011/0001658 A1* | | 1/2011 | Noble et al. ................... 342/107 |
| 2011/0074631 A1* | | 3/2011 | Parker ............................ 342/378 |
| 2012/0256789 A1* | | 10/2012 | Bull et al. ................. 342/357.25 |

OTHER PUBLICATIONS

Witzgall, Hanna, et al., "Single Platform Passive Doppler Geolocation With Unknown Emitter Frequency," *IEEEAC*, Paper # 1316, Version 4, 8 pp., Updated Dec. 28, 2009, Copyright 2010.

M. Sanjeev Arulampalam, et al., "A Tutorial on Particle Filters for Online Nonlinear/Non-Gaussian Bayesian Tracking," *IEEE Transactions on Signal Processing*, vol. 50, No. 2, 15 pp., Feb. 2002.

* cited by examiner

*Primary Examiner* — Harry Liu
(74) *Attorney, Agent, or Firm* — Dawn-Marie Bey; Bey & Cotropia PLLC

(57) ABSTRACT

The described invention allows for rapid geolocation of one or more RF emitters using a single moving collection platform. Inaccuracies of conventional frequency of arrival (FOA) geolocation methods are overcome by solving simultaneously for emitter location and a potential emitter drift associated with an observed emitter frequency. Certain embodiments may utilize particle filtering algorithms to recursively update multimodal state densities that are typical of solutions involving both unknown emitter location and nonstationary emitter carrier drift. Moreover, certain properties of particle filters may be exploited to provide a geolocation solution given a complex multimodal state space composed of emitter location and a non-stationary emitter frequency required for FOA.

25 Claims, 13 Drawing Sheets

DIVERSIFIED DOPPLER FOR SINGLE PLATFORM GEOLOCATION

CROSS-REFERENCE TO RELATED APPLICATIONS

The present application claims benefit of similarly titled U.S. Provisional Patent application Ser. No. 61/519,597, filed on May 25, 2011, which is incorporated by reference in its entirety. The present application also claims the benefit of U.S. Provisional Patent application Ser. No. 61/489,953, titled "Machine and Process for Self Localization Using Doppler," filed on May 25, 2011, which is incorporated by reference in its entirety. This application is related to contemporaneously filed U.S. patent application Ser. No. 13/479,602, titled "Machine and Process for Self Localization Using Doppler," filed May 24, 2012, which is incorporated by reference in its entirety.

CROSS-REFERENCE TO RELATED TECHNICAL DISCLOSURES

The present application makes use of technology disclosed in these related references, each of which is hereby incorporated by reference in its entirety:

Witzgall, Hanna—*A Reliable Doppler Based Solution for Single Sensor Geolocation*, submitted to Military Communications Conference (MILCOM), October 2012.

Witzgall, Hanna, et. al.—*Single Platform Passive Doppler Geolocation with Unknown Emitter Frequency*, Aerospace Conference, March 2010 IEEE, ISBN 978-1-4244-3887-7.

Witzgall, Hanna, et. al.—*Doppler Geolocation with Drifting Carrier*, Military Communications Conference, November 2011 IEEE, ISBN 978-1-4673-0079-7.

Arulampalam, M. Sanjeev, et al.—*A Tutorial on Particle Filters for Online Nonlinear/Non-Gaussian Bayesian Tracking*, IEEE Transactions on Signal Processing, February 2002, ISSN 1053-587X.

FIELD OF THE INVENTION

The present invention relates to geolocation of a radio frequency ("RF") emitter. More particularly, the present invention relates to single moving platform geolocation of an RF emitter using Doppler-shifted Frequency of Arrival ("FOA") observations and particle filtering algorithms to recursively update multimodal state densities.

BACKGROUND

In the well-known Doppler equation, the frequency observed by a moving platform is shifted in a nonlinear fashion relative to the emitter's carrier frequency $f_e$ and the geometric relationship between the emitter and the platform, as shown below in Equation 1:

$$\Delta f = \left(\frac{v\cos\theta}{c}\right) f_e \qquad \text{Equation 1}$$

where $\Delta f$ is the Doppler shift, $v$ is the platform speed, $\theta$ is the cone angle between the emitter and the platform velocity vector, and $c$ is the speed of light. Multiple Doppler observations can be triangulated and used to solve for the unknown emitter location.

To date, the most common methods for geolocation of uncooperative RF emitters employ multilateration (i.e., multiple platforms). Typically these methods employ measurements of Time Difference of Arrival ("TDOA") and/or Frequency Difference of Arrival ("FDOA") of radar signals using at least two sensors located on separate platforms. For example, the 3D position of an emitter may be determined by measuring the TDOA of a signal at four or more spatially separate platform receiver sites located different distances from the signal source. If the platform and emitter are in relative motion with respect to one another, FDOA may be employed either independently or in addition to TDOA to determine the emitter position based on vector velocities and the observed relative Doppler shift.

FDOA uses the difference of frequencies collected simultaneously by at least two different moving sensors. As shown in Equation 2, below, the FDOA observable $\Delta\omega$ describes the Doppler shift caused by the relative change in range rate between two collection platforms:

$$\Delta\omega = \frac{f_e}{c} \frac{d}{dt}(r_1 - r_2) \qquad \text{Equation 2}$$

where the variable $r_k$ represents the range between a receiver k and the emitter.

A primary advantage of the FDOA observable is that it largely removes the geolocation algorithm's dependence on an unknown emitter's frequency. This insensitivity is seen in the Equation 2 where the unknown emitter frequency $f_e$ is divided by the speed of light. Because the emitter's frequency is often in the hundreds of MHz and the speed of light is roughly $3\times10^8$ m/s, large uncertainty in the emitter frequency estimate is usually still well below the sensor noise floor. This almost invariance to emitter frequency uncertainty greatly simplifies the geolocation solution by allowing the state space to be composed of only the emitter position. This stationary state space (no physical emitter movement) can be solved efficiently using, for example, an iterative Gauss-Newton gradient descent algorithm.

Unfortunately, there are a number of disadvantage to employing FDOA-based emitter location algorithms in practice, such as the requirement for two simultaneous platforms. Furthermore, local oscillators (sensors) onboard small unmanned aerial vehicles (UAVs) that baseband received signals are often relatively stable, but biased. Because the relative difference of these two local oscillators forms the basis of the FDOA measurement, it is important that the biases are corrected. This is sometimes done using known calibration tones present in the collected data, however, this requires even more resources and further motivates a robust, single sensor, FOA geolocation solution.

The FOA measurement equation is derived directly from Equation 1 by rearranging terms to isolate the observed Doppler-shifted frequency $f_{obs}$ from the unobserved Doppler shift $\Delta f$ that depends on the emitter's unknown carrier frequency $f_e$. Furthermore, the cosine term can be expanded to explicitly contain the state variables of emitter location $[x_e, y_e]^T$ and emitter frequency $f_e$ by writing out the dot product between the sensor velocity $[v_x, v_y]^T$ and the line of sight between the emitter and the collection platform $[x, y]^T$:

$$f_{obs} = \left[1 - \frac{1}{c}\frac{(x-x_e)v_x + (y-y_e)v_y}{c\sqrt{(x-x_e)^2 + (y-y_e)^2}}\right] f_e \qquad \text{Equation 3}$$

A primary reason that the FOA method is generally not considered an operational geolocation option is due to its tendency to produce unreliable results. Without a priori knowledge of an emitter's transmission frequency, a geolocation engine must simultaneously solve for ground location and frequency of the emitter of interest. Provided a stable carrier, the Gauss-Newton method, among others, may product an adequate solution over the course of a collection long enough to obtain sufficient measurement independence for a unique solution. However, the Gauss-Newton method has a strong tendency to produce erroneous estimates if insufficient geometries are collected due to the correspondence of many possible solutions to the observations. In these cases, the optimization often gets trapped in erroneous local minima. In other words, the expected solution may converge to one of several potential solutions that are false.

The situation is made more challenging by the fact that most commercial transmitter systems do not have strict tolerances on oscillator stability which means that an emitter's carrier frequency can drift significantly during normal operation. Failing to account for frequency drift observed over the course of triangulation time required to determine a unique solution will cause gross inaccuracies in geolocation estimates. However, including a non-stationary drift term in the geolocation solution eliminates the suitability of Gauss Newton and similar techniques, because it requires a stationary state model. This motivates the need for a new solution that can efficiently represent and track in a non-linear, non-convex, multimodal state space.

SUMMARY OF THE INVENTION

Exemplary embodiments described herein overcome the above described drawbacks of conventional FDOA multiplatform geolocators. In certain embodiments, the described invention allows for rapid geolocation of one or more RF emitters using a single moving collection platform. These embodiments overcome the geolocation inaccuracies of conventional FOA methods by solving simultaneously for the emitter location and the potential emitter drift. Specific embodiments may utilize particle filtering algorithms to recursively update multimodal state densities that are typical of solutions involving both unknown emitter location and nonstationary emitter carrier drift. These embodiments provide a more robust and accurate solution compared with conventional FOA methods. Moreover, certain properties of particle filters may be exploited to provide a geolocation solution given a complex multimodal state space composed of emitter location and a non-stationary emitter frequency required for FOA.

In certain embodiments, multiple independent observables based on Doppler characteristics may be utilized to provide instantaneous or near-instantaneous estimates of an emitter location and carrier frequency. These measurements may be employed alone or in combination with particle filtering algorithms to achieve unprecedented accuracy and speed using single-receiver, single-platform geolocation.

In one aspect of the invention, a method of determining a location of a radio frequency (RF) emitter using an RF receiver located on a single moving platform is provided. The method includes receiving, by the receiver, an RF signal transmitted by the emitter over a period of time. Frequency of arrival (FOA) data of the RF signal, such as but not limited to Doppler-shifted frequency of the emitter, a location of the receiver, and a velocity of the receiver, may be measured over the period of time. This FOA data may be employed to determine an estimate of a frequency of the emitter, wherein the estimated frequency of the emitter includes an estimate of a frequency drift. Finally, an updated estimate of the location of the emitter may be determined based on the estimate of the frequency of the emitter.

In another aspect of the invention, a system for determining a location of a radio frequency (RF) emitter is provided. The system typically includes at least a receiver and a processor. The receiver is on-board a platform and is adapted to receive an RF signal transmitted by an emitter over a period of time. The processor is in communication with the receiver and is adapted to measure frequency of arrival (FOA) data (e.g., Doppler-shifted frequency of the emitter, a location of the receiver, and a velocity of the receiver) of the RF signal over the period of time. The processor may use this data to determine an estimate of a frequency of the emitter based on an estimate of the location of the emitter, wherein the estimated frequency of the emitter includes an estimate of a frequency drift. Finally, the processor may determine an updated estimate of the location of the emitter based on the estimate of the frequency of the emitter. The processor may be located on-board the platform or may be located external to the platform, for example, in communication with the receiver.

In yet another aspect of the invention, a system capable of determining the position of a radio frequency (RF) emitter is provided. The system may include a receiver for receiving an RF signal from an RF emitter. The system may also include a processor for determining an estimated position of the RF emitter based on two or more measurements selected from the group consisting of FOA, FOA-DOT, FOA-DOT-DOT, FDOA, and D-FDOA.

These and other aspects of the invention will be better understood by reading the following detailed description and appended claims.

BRIEF DESCRIPTION OF THE FIGURES

The preferred embodiments of the present invention are illustrated by way of example and are not limited to the following figures.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions. All terms used herein are intended to have their ordinary meaning in the art unless otherwise provided.

The following table contains a list of acronyms and abbreviations with corresponding meaning that are discussed throughout this disclosure.

TABLE 1

| Acronym | Meaning |
| --- | --- |
| AOA | Angle of Arrival |
| CAF | Cross-Ambiguity Function |
| CRLB | Cramer-Rao Lower Bound |
| CONOP | Constrained Optimization |
| D-DFOA | Difference-DFOA |
| DFOA | Difference of FOA |
| FDOA | Frequency Difference of Arrival |
| FOA | Frequency of Arrival |
| FOA-DOT | Rate of Change of FOA |
| FOA-DOT-DOT | Doppler Curvature = $2^{nd}$ Derivative of FOA |
| TDOA | Time Difference of Arrival |

Figure 1:
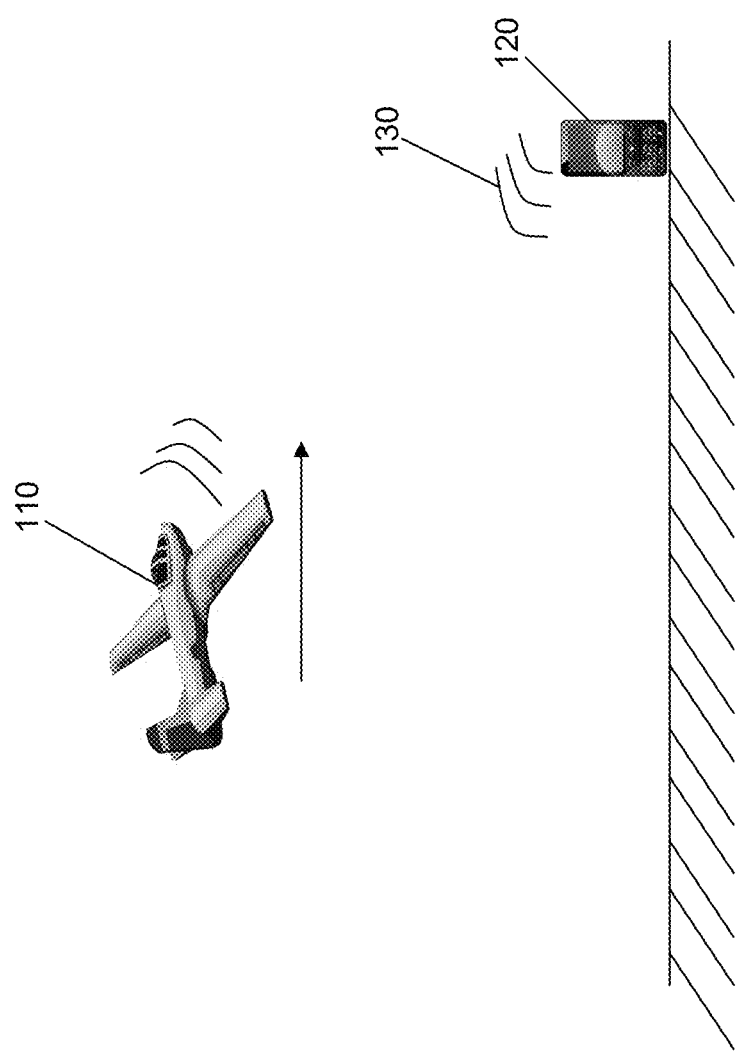
FIG. 1 illustrates a system according to one exemplary embodiment of the invention.

Referring to FIG. 1, an exemplary system according to the invention is illustrated. As shown, a platform 110 is moving with respect to an emitter 120. The platform 110 may be any equipment capable of including a suitable receiver and accompanying hardware, firmware and software, while moving with respect to an emitter 120. For example, a platform 110 may include, without limitation, a car, truck, van, bus, military vehicle, plane, UAV, helicopter, boat, bike, motorcycle, scooter, train or the like. It will be appreciated that a platform 110 may also refer to a wearable system, such as a backpack or the like worn by a person. In preferred embodiments, the platform 110 may be an aerial vehicle such as a UAV or plane.

The platform 110 may comprise a receiver for receiving RF signals 130 from the emitter 120. In certain embodiments, the receiver may comprise one or more antennas (e.g. omnidirectional antenna) adapted to receive RF signals 130 from an emitter 120 of interest and may be employed to determine one or more Doppler measurements for the emitter (e.g., FOA). In certain embodiments, the platform 110 may also include a GPS receiver for providing time and position reference information.

The platform 110 will typically include an on-board computer in communication with the receiver. The computer comprises at least a processor for processing data and a memory for storing data, and may be adapted to process the received emitter signals 130 in order to generate an estimate of the emitter's 120 location. The received signals, estimated emitter location and/or a platform location may be stored in volatile or non-volatile memory of the computer, and such information may be updated in real time or near real time.

In certain embodiments, the computer may be in communication with a ground-based server (not shown) via a network or the like such that data may be transmitted from the computer of the platform to the server. The server and/or the computer may comprise a processor for processing data, memory, I/O ports for receiving data, and may be coupled to any number of user input or output devices such as a keyboard, mouse, monitor, printer or the like. The received signals, platform location and/or estimated emitter location may be displayed on, for example, a monitor or other display in communication with the computer and/or the server. Although only a single platform 110 is shown, a server may be in communication with any number of computers detecting any number of emitters 120.

In certain embodiments, the computer or server may be in communication with an emitter database (not shown), which may be located either at the computer as, for example, a local or external drive, or at the server or other remote location in communication with the computer. Generally, the emitter database may refer to a database used to store information about emitters 120 tracked by a platform's computer. If multiple platforms 110 are tracking multiple emitters 120, the emitter database may comprise emitter information collected from each of the platforms.

In operation, the platform 110 receives RF signals 130 from one or more emitters 120 located at an unknown location. Examples of emitters include, but are not limited to cellular phones (e.g., smart phones), GPS devices, radios, audio/video equipment, personal communications systems, and military and commercial radar and communication equipment.

In certain embodiments, the above described system may employ a particle filtering algorithm to recursively update multimodal state densities related to emitter location and/or emitter carrier frequency. For example, the inventive methods may solve the complex multimodal state equations that arise with a drifting RF carrier for the RF emitter location. Particle filters are sequential Monte Carlo methods based on point mass (or "particle") representations of probability densities, which can be applied to a state-space model and which may generalize a Kalman filtering method. However, the invention is not necessarily limited to using particle filters to solve for the multimodal state densities found in the simultaneous solution of emitter location and frequency estimate, and non-linear optimization techniques can also be employed to fit the data in a piece-wise fashion. For completeness, a particle implementation will be described.

Particle filters are generally concerned with representing the posterior probability density $p(x_{1:k}|Z_{1:k})$ using a set of discrete particles $x_k^i$ and their associated weights $w_k^i$, as shown below in Equation 4:

$$p(x_{1:k} | z_{1:k}) \approx \sum_{i=1}^{N} w_k^i \delta(x_k - x_k^i) \quad \text{Equation 4}$$

where δ is the Dirac function, the particle's weight $w_k^i$ represents its conditional likelihood, and N is the number of particles.

Particles $x_k^i$ may be drawn from an importance or proposal density q according to the principle of importance sampling.

$$x_k^i \sim q(x_k^i | x_{1:k-1}^i, z_k) \quad \text{Equation 5}$$

As shown in Equation 5, importance sampling acknowledges the difficulty of directly sampling from the often complex posterior probability density $p(x_{0:k}|Z_{1:k})$ and instead proposes to approximate the true posterior with an importance or proposal density $q(x_{0:k}|z_{1:k})$ from which it is relatively simple to sample (e.g., assuming a Gaussian distribution).

Weights may be employed to correct for the difference in probability between the samples drawn from the proposal density and the true posterior density. For example, a particle filter may normalize updated weights and may send these weights to a resampling algorithm. Such resampling of particles helps to avoid the degeneracy condition where only a single particle has any likelihood probability. Particles may be selected with replacement from the probability distribution of the weights' cumulative sum. By eliminating low-probability particles and duplicating high-probability particles, a particle filter can re-distribute particles to relevant regions and improve accuracy with little increase in computation.

Accordingly, a particle filter may comprise four parts. The first part may calculate a proposal density; the second part may sample this proposal density; the third step may calculate the correction weights; and the fourth step may resample. The procedure may be repeated with the resampled data. In this way, a particle filter can provide a recursive approximation of the state density conditioned on the sequence of observations. The maximum a posteriori estimate may be obtained from the approximated posteriori probability by either computing the mean or by taking the sample with the highest weight.

The inventive systems and methods described herein exploit certain properties of particle filters to provide a geolocation solution given a complex multimodal state space composed of emitter location and a non-stationary emitter frequency required for FOA. In certain embodiments, solutions are proposed based on the factorization of the conditional joint state probability of the emitter $p(xe_k^i, fe_k^i | z_k)$ into a location term $p(xe_k^i | z_k)$ and a frequency term $p(fe_k^i | xe_k^i, z_k)$ using Bayes rule as shown in Equation 6:

$$p(xe_k^i, fe_k^i | z_k) = p(fe_k^i, | xe_k^i, z_k) p(xe_k^i | z_k) \quad \text{Equation 6}$$

where $xe_k^i = [x_e^i, y_e^i]^T$ represents the emitter location vector and $fe_k^i = [fe_k^i, \dot{fe}_k^i]^T$ is composed of the current carrier estimate and its drift. Importantly, the joint density cannot be simply factored as shown in Equation 7, because of the conditional dependences of $xe_k^i$ and $fe_k^i$.

$$p(xe_k^i, fe_k^i | z_k) = p(xe_k^i | z_k) p(fe_k^i, z_k) \quad \text{Equation 7}$$

One advantage of the factorization of Equation 6 is that it allows the particles to be drawn from a proposal density approximating only the emitter location density, rather than the joint space also containing emitter frequency. The particle's frequency information may therefore be conditionally updated (e.g., using a Kalman filter) based on the emitter location and observation. The representation of the state probability density into a factorized portion based on the drawn locations $xe_k^i$ and conditionally updated frequency information $fe_k^i$ enables a more efficient state density selection and leads to a better performance with fewer particles. A detailed explanation of particle filters may be found in S. Arulampalam, S. Maskell, N. Gordon, T. Clapp "A Tutorial on Particle Filters for Online Nonlinear/NonGaussian Bayesian Tracking," IEEE Transactions on Signal Processing, 2002, incorporated herein in its entirety.

Figure 2:
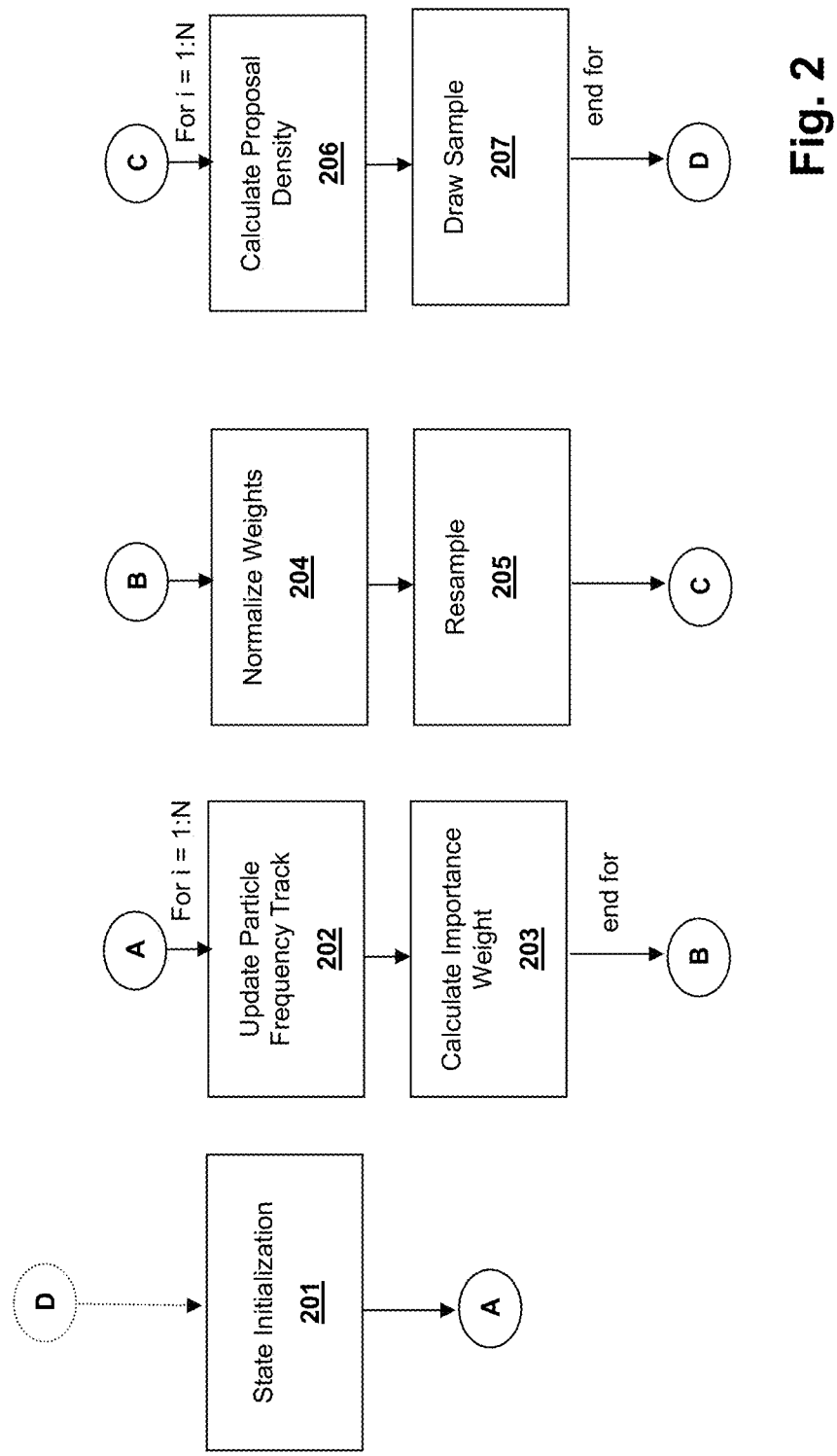
FIG. 2 illustrates an exemplary single platform geolocation method according to an embodiment of the invention.

Referring to FIG. 2, an exemplary inventive single platform geolocation method employing a Doppler Particle Filter (DPF) algorithm is illustrated. The method begins with state initialization 201 outside of a particle filter function by modeling a region of interest with particles, for example, in a grid like fashion. The grid may be static or dynamic, and the location uncertainty of each particle (i.e., location covariance) may be determined by the initial grid spacing. However, there are many alternative embodiments that may be employed to initialize particle locations, for example, a priori known preferential locations may be utilized. Additionally, particle states may be initialized with frequencies, and particle location may conditioned upon the assigned particle frequency.

As shown in Equation 8, below, the DPF may be initialized by supplying available FOA observations $Z_k$ and the platform position $x_1$ and velocity $v_1$ data covering a time interval. For example, upon receiving FOA observations from an unknown emitter, an estimated emitter frequency and location may be set, and the emitter's frequency drift may initially be set to zero.

$$[\{x_k^i, Px_k^i\}_{i=1}^N] = DPF\{\{x_{k-1}^i, Px_{k-1}^i\}_{i=1}^N, Z_k, x_1, v_1\} \quad \text{Equation 8}$$

At steps 202, as FOA observations $Z_k$ are collected, the DPF algorithm may employ a nonlinear Bayesian filter, such as but not limited to a Kalman filter, for each particle to determine the most likely frequency track conditioned on that particle's location $x^i$ and the FOA observations. The FOA observations may be entered on a sample by sample basis, block basis, segment basis or over an entire data block.

$$[f_k^i, resid_k^i] = \text{Kalman}[f_{1:k-1}^i, Pf_{k-1}^i, Z_k, x_{k-1}^i, x_1, v_1] \quad \text{Equation 9}$$

A Kalman filter generally assumes that the posterior density at every time step is Gaussian and, hence, parameterized by mean and covariance. A Kalman filter may first update the a priori state information $\hat{x}_k$ and covariance $\hat{P}_k$ according to a process model F and the process noise Q, as shown in Equation 10, below:

$$\hat{x}_k = F x_{k-1}$$

$$\hat{P}_k = F P_{k-1} F' + Q \quad \text{Equation 10}$$

The Kalman filter may then provide the best posteriori estimate $x_k$ by weighting the a priori prediction error with the Kalman gain K as shown in Equation 11, where R is the measurement noise.

$$x_k = \hat{x}_k + K(z_k - \hat{z}_k(\hat{x}_k))$$

$$P_k = \hat{P}_k - K(H\hat{P}_k H' = R) K'$$

$$K = \hat{P}_k H' | H \hat{P}_k H' + R) \quad \text{Equation 11}$$

In certain embodiments, the Kalman filter may be used to discover the carrier frequency provided the hypothesized emitter location. Therefore, the process equation may be a two-dimensional linear model as shown in Equation 12

$$F = \begin{bmatrix} 1 & \Delta T \\ 0 & 1 \end{bmatrix},$$ Equation 12 which may be used to update the prior frequency state $x_{k-1} = [f_e, \dot{f}_e]^T$ for the specified time interval $\Delta T$. The posteriori estimate may use the Kalman gain to weight the prediction error between the FOA observations $z_k$ and the predicted observation $\hat{z}_k$ provided the emitter location. It will be appreciated that, in other embodiments, a Gauss-Newton method may be employed in addition to or in place of a Kalman filter.

The next step 203 of the particle filter is to determine the importance weights providing the proposal's correction term:

$$w_k^i = \frac{p(z_k \mid x_k^i, F_k^i, Z_{k-1}) p(x_k^i \mid x_{k-1}^i)}{q(x_k^i \mid X_k^i, Z_k)}$$ Equation 13

An importance weight is defined as the ratio between the true updated state probability $p(z_k|x_k^i)p(x_k^i|x_{k-1}^i)$ and the probability of drawing that state from the importance density $q(x_k^i|x_{k-1}^i, z_k)$:

$$w_k^i = w_{k-1}^i \frac{p(z_k \mid x_k^i) p(x_k^i \mid x_{k-1}^i)}{q(x_k^i \mid x_{k-1}^i, z_k)}$$ Equation 14

Here the term $p(z_k|x_k^i)$ represents the likelihood of the state $x_k^i$, $p(x_k^i|x_{k-1}^i)$ is the probability of the particle's updated state given the process model, and $q(x_k^i|x_{1:k-1}^i, z_k)$ is the probability of having $x_k^i$ been drawn from the importance density.

The likelihood term $p(z_k|x_k^i, F_k^i, Z_{k-1})$ may dictate the probability of observing $z_k$ given the emitter location $x_k^i$, its associated carrier track $F_k^i$, and all the available observations $Z_{k-1}$. The weight's denominator is simply the proposal density likelihood $q(x_k^i|X_{k-1}^i, Z_k)$ or in other words the Gaussian probability of drawing $x_k^i$ given its parent particle's location and covariance. Therefore the weights may be largely determined by how well the frequency track's process model accommodates the FOA observations.

Figure 3:
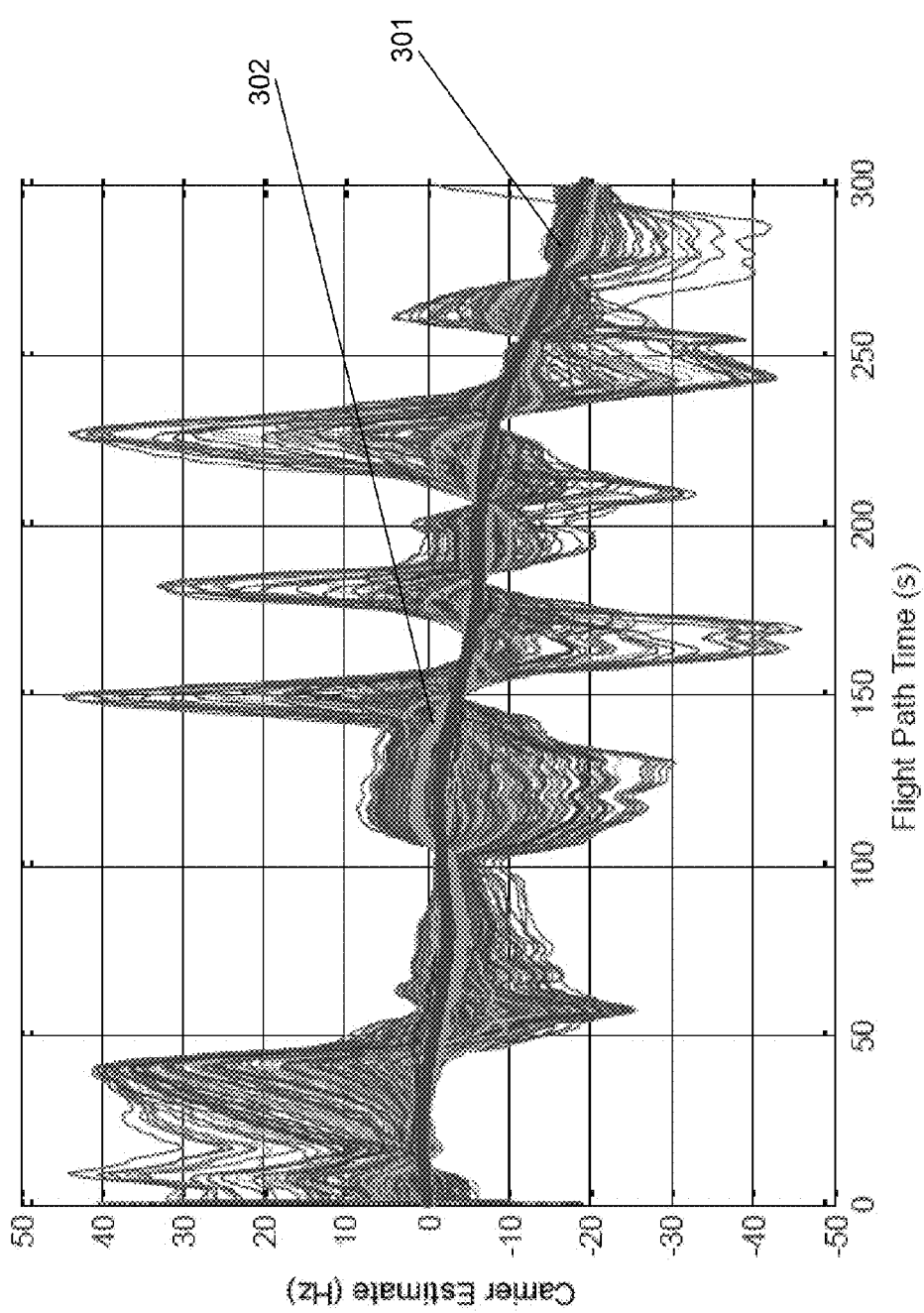
FIG. 3 depicts a graphical representation of multiple carrier frequency estimates over a platform flight path time.

Referring to FIG. 3, Kalman calculated carrier frequency tracks conditioned on particle location and FOA observations (e.g., observed emitter frequency, platform position, and platform velocity over a time period) are shown. The various carrier paths produced by hypothesizing particles at different locations are illustrated, where line 301 denotes true emitter drift and line 302 denotes the most likely frequency track corresponding to the process model.

As shown, the high curvature of some paths represents the contortions that the carrier drift would need to perform to produce the observed Doppler measurements. It is unlikely that a device would have a sufficiently unstable emitter to produce these types of drifts. A much more likely model is that the carrier frequency drifts slowly over time and changes its drift rate even more slowly. These carrier frequency characteristics can be built into the Kalman filter process model. The more likely the observations support this type of process model, then the more likely that the emitter is at that location. Thus the particle filter may prefer and preferentially weight particles that have a carrier drift that corresponds well with the slow varying process model. It will be appreciated that, in other embodiments, particle weights may be determined as a residual fitting error of a parametric curve fit to observed Doppler measurements found with an optimization technique on a piecewise portion of the measurements.

Referring back to FIG. 2, the particle weights may then be normalized 204 according to Equation 15.

$$w_k^i = \tilde{w}_k^i / \sum \tilde{w}_k^j$$ Equation 15

At step 205, the weighted particles may be entered into any resampling function (e.g., according to Equation 16) where higher weights are more likely to be selected multiple times.

$$[\{x_k^j, i^j\}_{j=1}^N] = \text{Resample}\,[\{x_k^j, w_k^j\}_{j=1}^N]$$ Equation 16

Such resampling prunes unlikely particles, but may cause an inherent degeneracy where all the particles are reassigned as one or two of the most probable samples.

In order to avoid this degeneracy, a child particle may be drawn from a calculated proposal density of the surviving parent particle. Accordingly, the proposal density may be calculated 206 according to Equation 17 for each particle.

$$q(x_k^i \mid X_{k-1}^i, Z_k) = N(x_k^i \mid x_{opt}^i, Px_k^i),$$ Equation 17 where $(x_{opt}^i, Px_k^i) = \text{EKF}[f_{1:k}^i, z_k, \text{rex}_k^i, x_1, v_1]$.

As shown in Equation 17, the proposal density $q(x_k^i|X_{k-1}^i, Z_k)$ is defined as the Gaussian $N(x_k^i|x_{opt}^i, Px_k^i)$ calculated from an extended Kalman filter (EKF) conditioned on the observations and the particle's associated frequency track.

At step 207 a sample child particle $$x_k^i \sim N(x_k^i; x_{opt}^i, Px_k^i)$$

may drawn from the calculated proposal density. In this fashion, the particles are efficiently herded into high probability regions of the state space and degeneracy is largely avoided.

It should be noted that, due to the principle of special relativity, the Doppler equations, equations derived therefrom, and the machines, systems, methods and other techniques described in this application can be adapted to any embodiment or environment where an emitter and receiver are in motion relative to one another, for example: where the emitter is stationary and the receiver is moving, or where the receiver is moving and the emitter is stationary, or where the emitter and receiver are both in motion relative to a third frame of reference (e.g. the surface of the Earth, or a satellite in space). It shall be understood by one of skill in the art that the inventions disclosed herein are applicable to any frame of reference and to obtaining either the position of the receiver or the emitter, and that to merely change the frame of reference and/or the object for which the position information is sought does not take an embodiment outside the scope of the invention.

It also will be apparent to one of skill in the art that the background material, examples, descriptions, and other disclosures contained in this application are equally applicable to any inertial frame of reference and to finding the position of either the receiver or the emitter. Thus, for example, where this application discloses a method involving a stationary emitter and a moving receiver, one of ordinary skill in the art could, with routine algebraic manipulation, apply the method to a moving emitter and a stationary receiver. Likewise, where this application discloses a method involving calculating the position of the emitter relative to the position of the receiver, one of ordinary skill in the art could apply the method to calculate the position of the receiver with respect to the emitter.

Doppler-Based Derivatives

In certain embodiments, multiple independent measurements of Doppler-based derivatives may be made within the same short time interval typically used to obtain a single frequency estimate and these derivative-derived measurements may provide unique information concerning the position of the emitter. The instantaneous measurements are estimates of the observed Doppler shifted frequency (FOA), the rate at which the Doppler shifted frequency is changing ("FOA-DOT"), and Doppler curvature ("FOA-DOT-DOT"). The FOA equation is captured in the standard Doppler equation (Equation 1). The FOA-DOT measurement equation is the first derivative of the FOA equation with respect to time, and the FOA-DOT-DOT measurement equation is the second derivative of the FOA equation with respect to time. It has been found that these measurement equations (FOA, FOA-DOT, and FOA-DOT-DOT) may be used to predict the observed estimates based on hypothesized location and emitter frequency. The measurements can be obtained using any number of estimation techniques, including but not limited to polynomial fits to measured frequencies during a measurement window. Moreover, each of these measurements may provide unique information about the Doppler signature which can be used to constrain the emitter position. For example, FOA-DOT is much less sensitive to carrier frequency and also carrier drift than FOA.

It has also been found that measurements obtained from measurement windows separated in time can be combined to form new Doppler based measurements, which add new information to further increase the accuracy of the estimate of emitter location. For example, an FOA estimate may be obtained at time T1 and again at time T2. Taking the difference of these estimates results in a new measurement equation referred to herein as Difference of FOA ("DFOA"). The DFOA is different from FDOA in that it uses the observed Doppler-shifted frequencies collected on board a single moving platform as opposed to requiring simultaneous collections on board two separate platforms in order to estimate the standard cross-ambiguity function ("CAF"). Further, the DFOA measurement differs from FOA-DOT because of the separate measurement windows (i.e., differing time scales) over which the Doppler rate of change is estimated and due to the curvature of the Doppler shift.

In certain embodiments of the invention, the discrete difference measurement DFOA ("D-DFOA") can also be used to approximate the curvature of the Doppler signature over time. Although the D-DFOA approximates the FOA-DOT-DOT over short time intervals, it contains different information which may improve geolocation estimates and, like DFOA and FOA-DOT, may become even more distinct as the time between samples used in the differencing increases. For example, the increase in information is most pronounced when the measurement windows span the period containing the zero Doppler measurement or the point of closest approach. Another combination is the difference of FOA-DOT at time 1 and FOA-DOT at time 2, which essentially provides a discrete time estimate of the FOA curvature.

The choice of the measurements to use will depend on the operational constrained optimizations ("CONOPs"). For example, for fast moving platforms targeting signals with high frequencies, the instantaneous FOA, FOA-DOT and FOA-DOT-DOT can provide the necessary information to solve for the position of the emitter (x, y) and the emitter frequency ($f_e$). If the altitude (z) is also required, these measurements can be combined with DFOA to provide the full x-y-z location of the emitter. As opposed to triangulation methods based solely on Doppler FOA measurements, the invention does not require waiting for a sufficient baseline to be established in order to triangulate the emitter location.

In certain collection scenarios there may be poor estimation accuracy over one or two measurement windows. In these scenarios, it may be necessary to employ several measurement windows in order to adequately measure the FOA and DFOA to support the desired geolocation performance. For example, when a relatively slow moving collection platform collects low frequency signals, the Doppler derivatives may be smaller and measurement noise may limit the estimation accuracy. In this case, the FOA and DFOA may be measured over a longer period of time to insure that there is a measurable difference. This time interval, even for the slowest platforms, will provide much faster convergence than waiting for the baseline required to triangulate the emitter location based on FOA alone.

Once the measurements are collected, there are a number of methods that can solve these nonlinear equations for the state estimates. Note that some care must be taken not to fall into local minima when the number of measurements does not fully resolve the state ambiguities.

Figure 4:
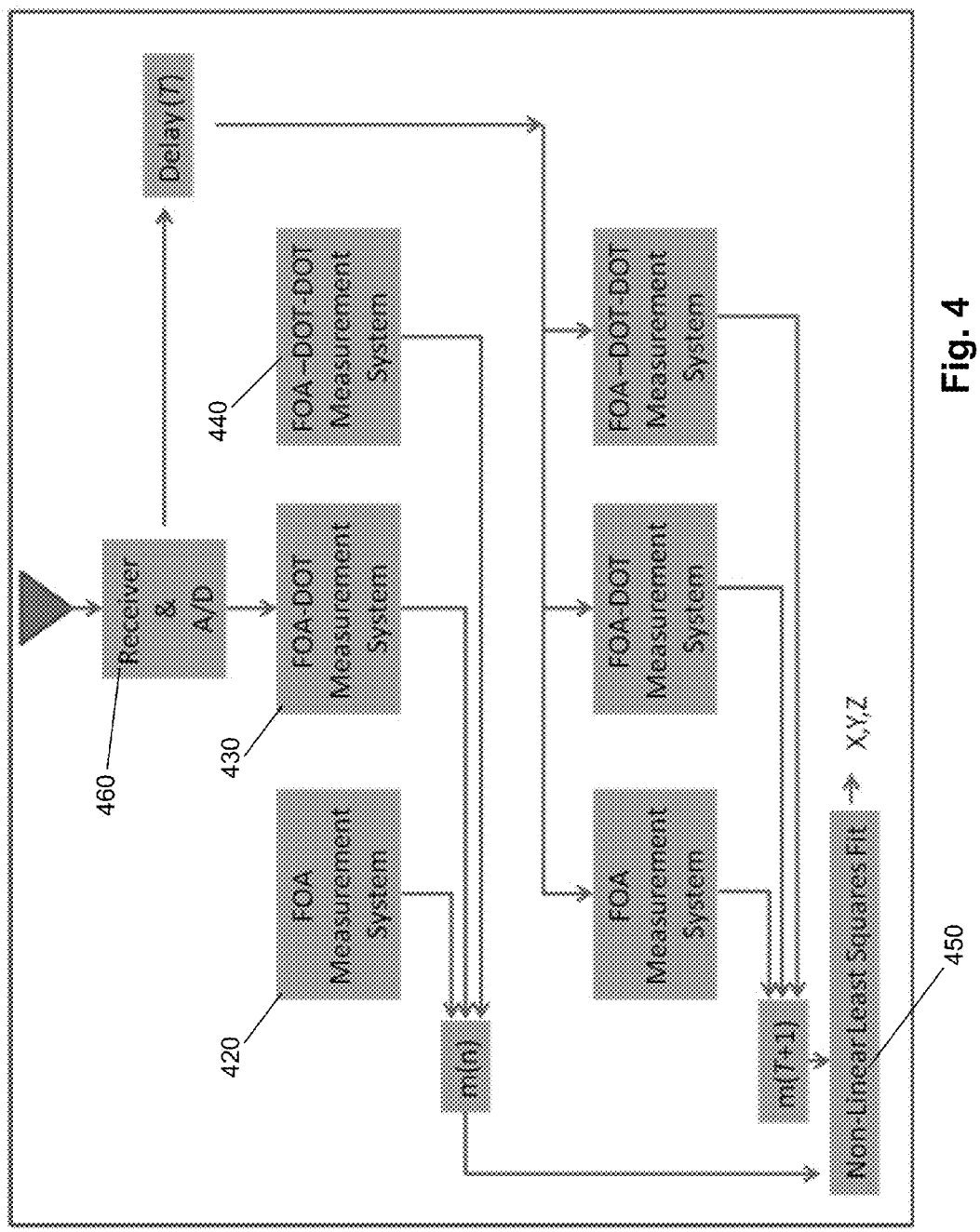
FIG. 4 illustrates a system according to one exemplary embodiment of the invention.

Referring to FIG. 4, a system according to one embodiment of the invention is illustrated. As shown, the system may comprise a receiver 460, which may be combined with or separate from an analog to digital converter. The system further comprises an FOA measurement system 420, an FOA-DOT measurement system 430, and FOA-DOT-DOT measurement system 440. Additionally, a processor or general computer 450 may be provided to calculate a non-linear least squares fit. As discussed above with respect to FIG. 1, each of the aforementioned systems may be on-board a moving platform. The individual measurements may be combined to determine a total solution, corresponding to the position of the emitter and having a particular confidence level.

Example 1

Figure 5:
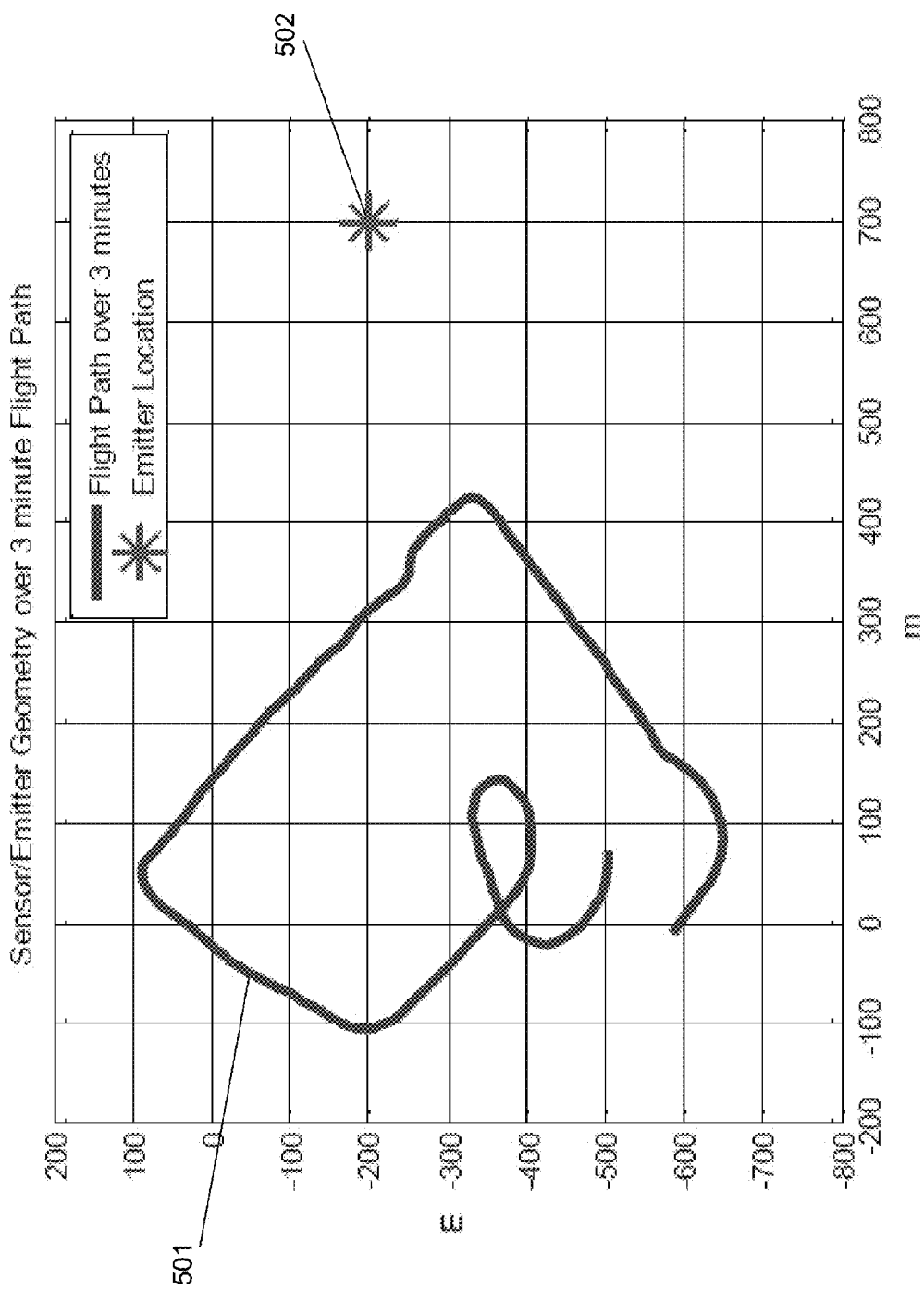
FIG. 5 illustrates an exemplary flight path of a platform with respect to the location of an emitter.

The performance of the above described DPF algorithm was examined for Doppler data simulated from a recorded UAV path, where the UAV attempts to determine the position of a 500 MHz RF emitter device in a 1 km² vicinity. The UAV's flight path 501 over a collection period of 3 minutes (180 s) is shown in FIG. 5. As shown, the UAV starts at approximately [0;−600] x-y point with a height of 150 meters and travels at a relatively slow, constant velocity range of from about 8 to about 18 m/s (i.e., about 20-40 mph). The star 502 denotes the position of the target RF emitter, which is placed outside and about 0.5 km from the center of the UAV flight path.

Figure 6:
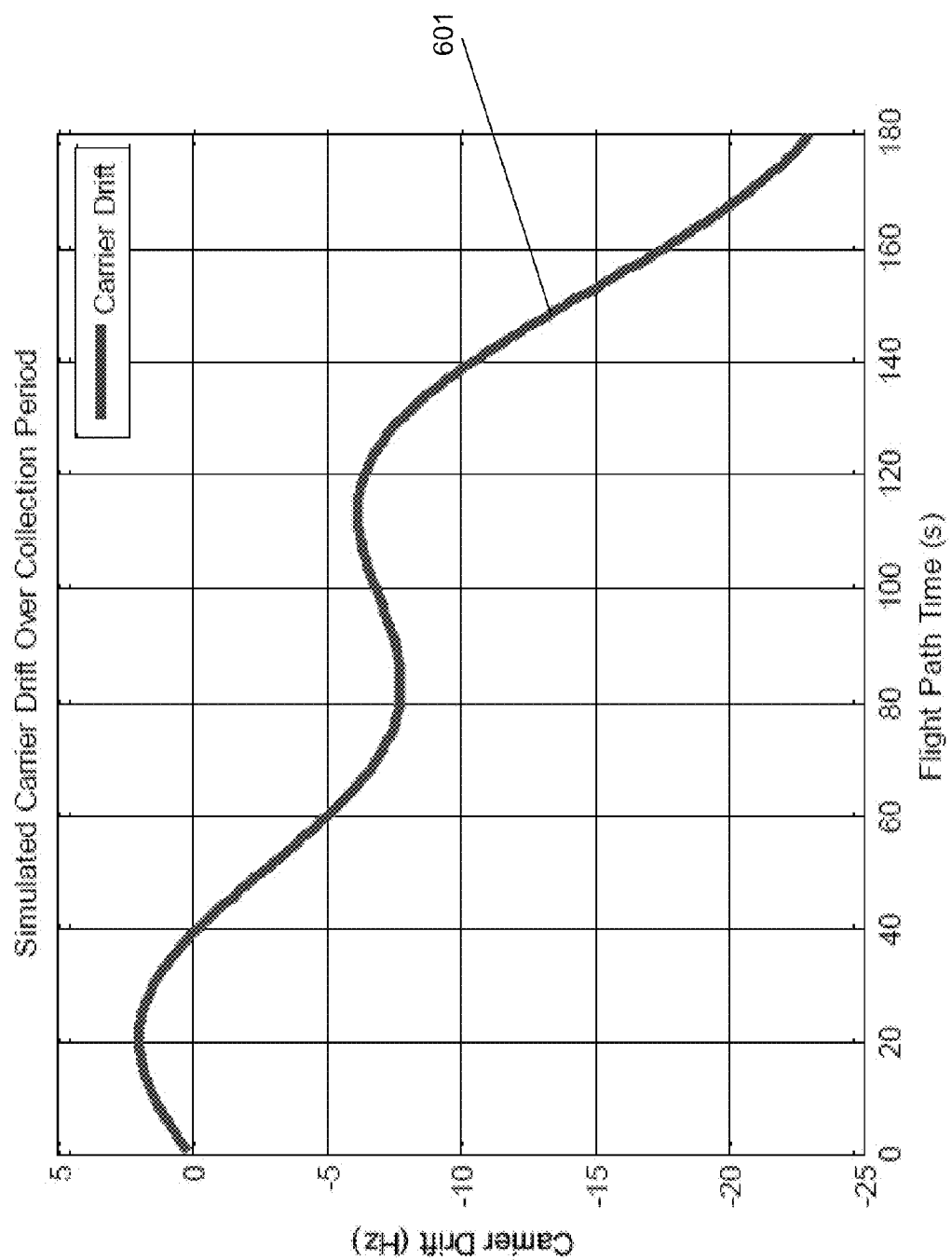
FIG. 6 illustrates the carrier frequency drift of the emitter of FIG. 5.

Referring to FIG. 6, the simulated emitter carrier drift is illustrated 601. As shown, a drift of greater than about 20 Hz over the course of three minutes is well within the operational tolerances (40 parts per billion) for most commercial emitter devices.

Figure 7:
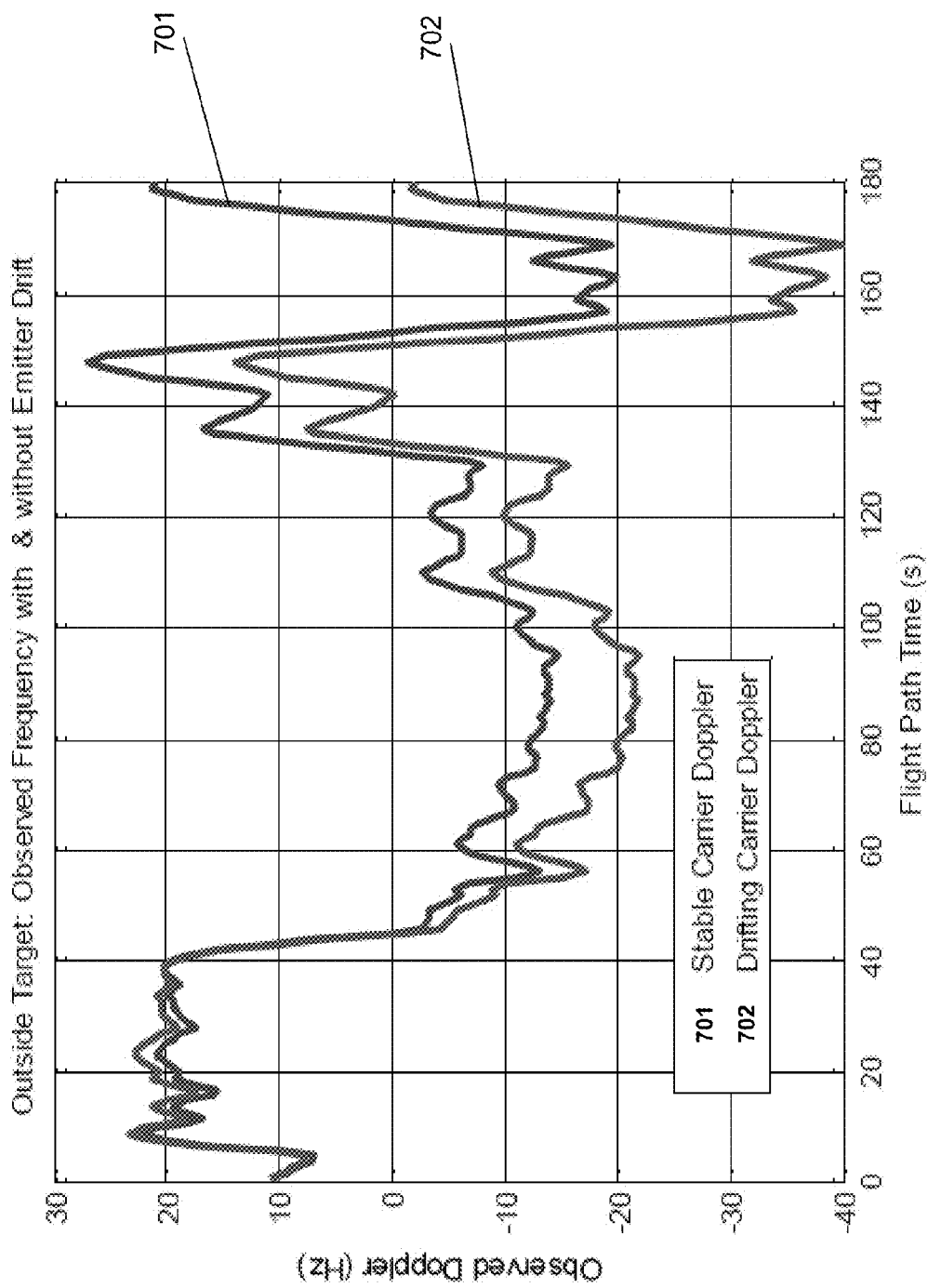
FIG. 7 depicts a graphical comparison of an observed Doppler effect for a stable emitter 701 to the observed Doppler effect 702 of an emitter having the carrier frequency drift of FIG. 6.

Referring to FIG. 7, a comparison between the expected Doppler from a stable 500 MHz emitted signal 701 and the observed Doppler 702 from the emitter with the drift described in FIG. 6 and geometry of FIG. 5 is shown. The Doppler profile of the stable 500 MHz carrier 701 is shown for UAV flight path shown in FIG. 5. It will be appreciated that the Doppler shift for these speeds and geometry ranges from about −20 to about 20 Hz.

The Doppler profile of the drifting carrier 702 are also shown, minus the 500 MHz frequency reference. As shown, the drift changes the observed frequencies, resulting in a less clean signature of where the target emitter is located over the course of the collection. By tracking the emitter drift, a significantly more accurate and reliable geolocation can be obtained.

Figure 8:
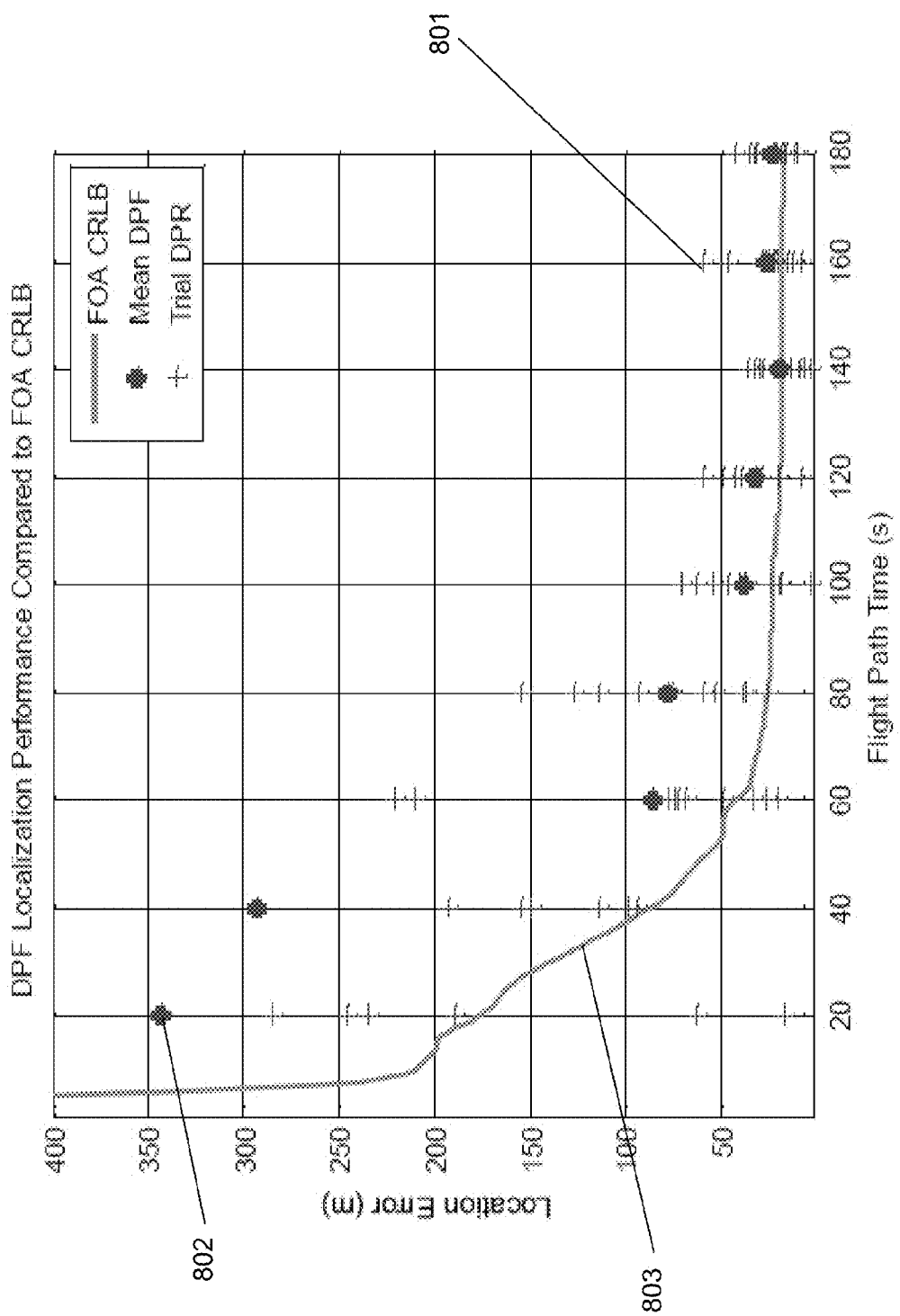
FIG. 8 depicts the geolocation accuracy of 10 test runs of a system running an exemplary DPF algorithm compared to the FOA Cramer-Rao lower bound (CRLB), assuming an unknown but stationary carrier.

Referring to FIG. 8, the geolocation accuracy of 10 test runs of the DPF algorithm are compared to the FOA Cramer-Rao lower bound (CRLB), assuming an unknown but stationary carrier. As shown, each cross 801 represents one Monte Carlo solution of the particle solver evaluated every 20 seconds over a three minute flight path time period. The bold crosses 802 represent the mean of the 10 runs.

The results indicate that exemplary DPF algorithms may consistently obtain 50 meters or less geolocation errors after the first minute of flight and may be capable of closely approaching the FOA CRLB of about 20 m at the end of the three minutes. The initial input parameters to the particle filter solution were 11×11=121 particles spread uniformly over a 1000 m×1000 m grid and offset by 23 meters in each direction. The measurement noise used to simulate the FOA observables was 1 Hz². In certain embodiments, the DPF algorithm may use this sensor noise value for its Kalman filter's measurement covariance R. The Kalman's process covariance, Q, or the prediction variance for the frequency track, was 0.5 Hz and 0.05 Hz for the emitter carrier frequency and its rate of change, respectively. The line 803 denotes the FOA iterative CRLB. It was derived based on the assumption of zero process noise so that the bound can be efficiently found using the EKF provided the correct state information and in this case also the correct track of the emitter's carrier drift.

Figure 9:
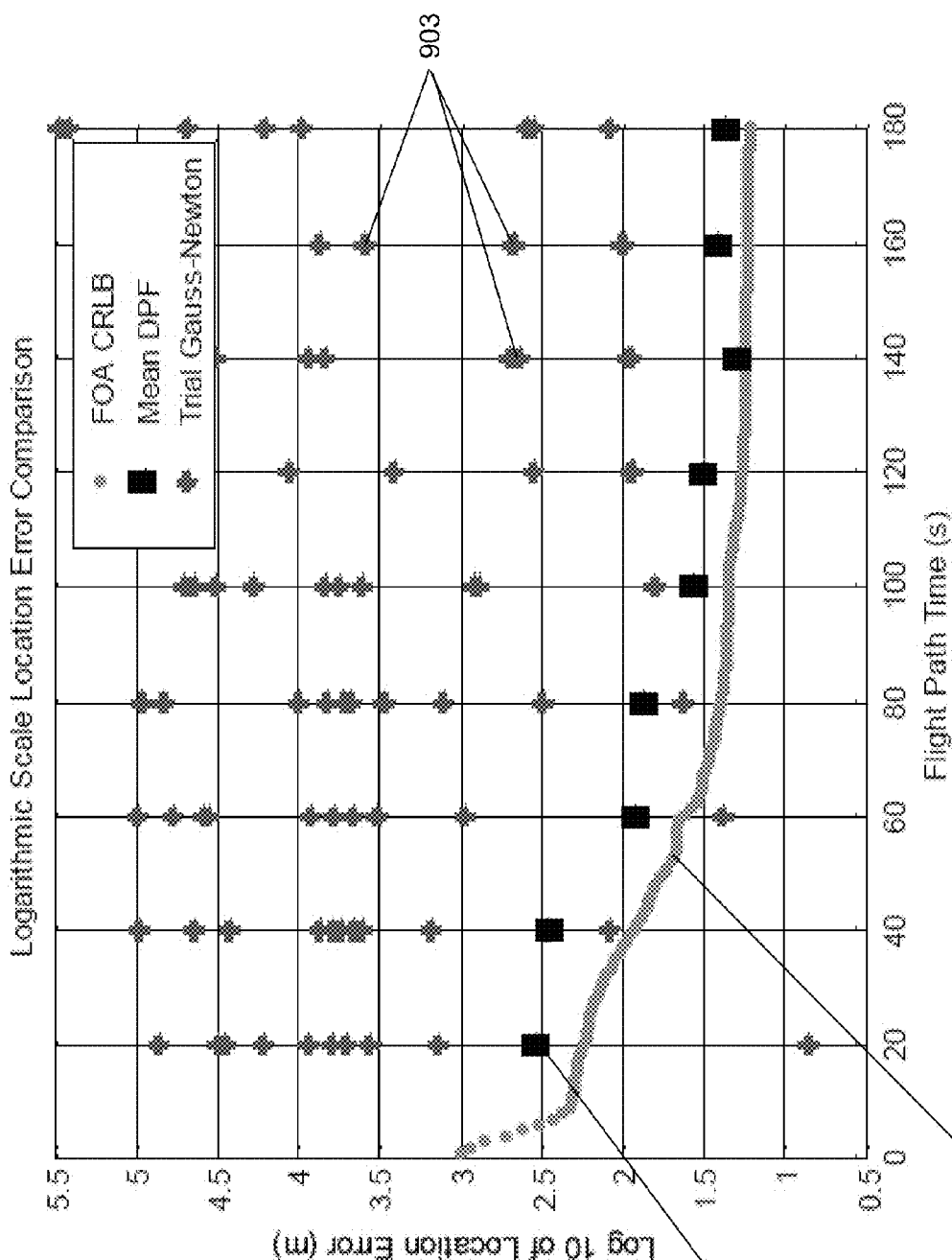
FIG. 9 depicts the error of an exemplary DPF algorithm and a Gauss Newton algorithm on a log 10 scale.

Referring to FIG. 9, the DPF algorithm and the Gauss Newton geolocation error is shown on a log 10 scale. The mean DPF algorithm error is shown as rectangular boxes 901, the FOA CRLB as circles 902, and the individual Gauss Newton trials as crosses 903. The Gauss Newton solution 903 assumes an unknown but stable carrier frequency. The logarithmic scaling shows the tendency of the Gauss Newton solution 1203 to vary widely and get trapped in local minima often as far as 10 km away from the actual solution and far outside the region of interest.

Example 2

Figure 10:
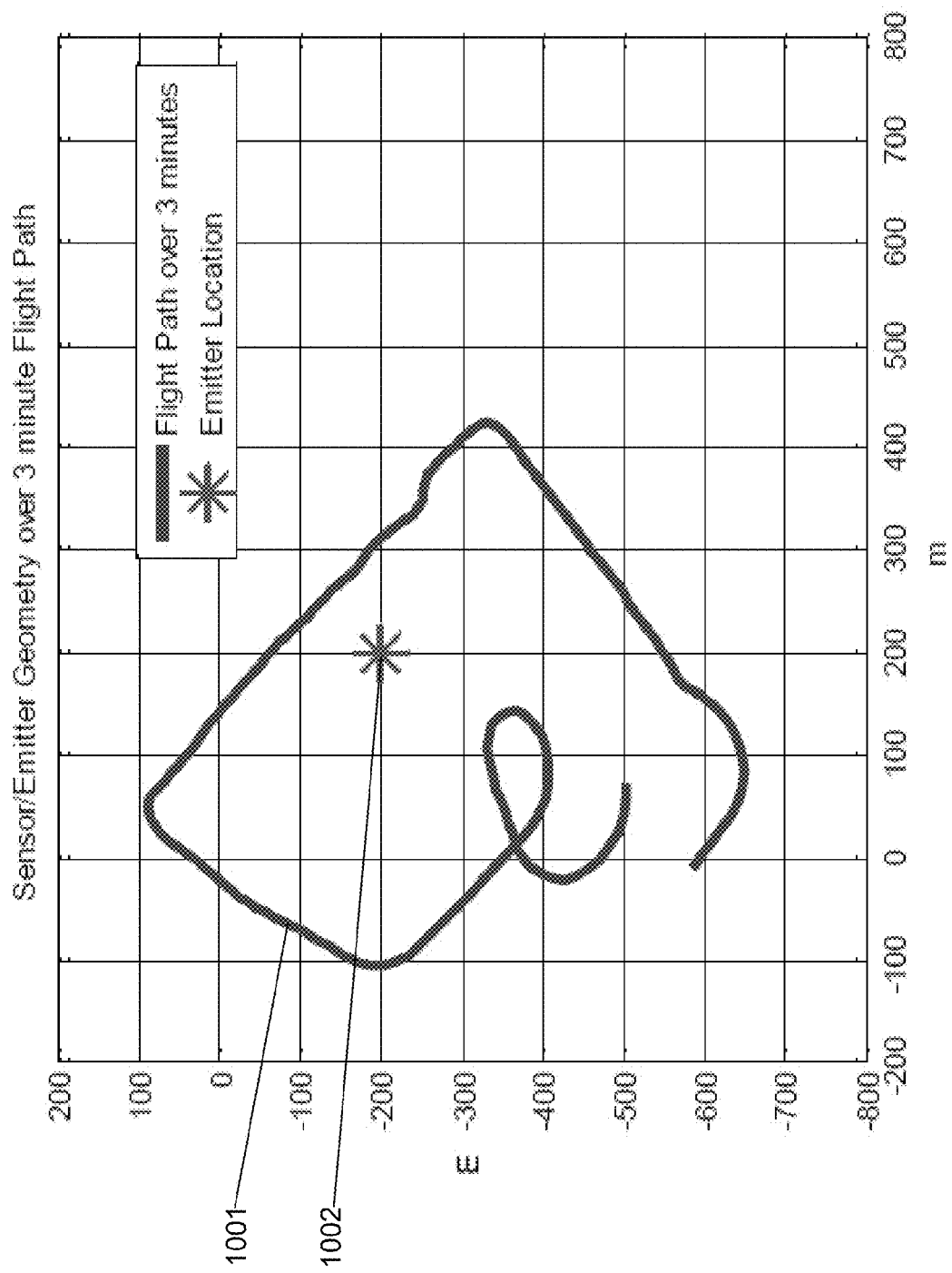
FIG. 10 illustrates an exemplary flight path of a platform with respect to the location of an emitter.

Referring to FIG. 10, the performance of a DPF algorithm according to the invention is examined for the case where a target emitter 1302 is located inside the UAV's flight loop 1001. As shown, the star 1002 denotes the position of the target RF emitter and the line 1001 shows the UAV's flight path over a collection period of 3 minutes (180 s). Similar to Example 1, the emitter comprises a variable 500 MHz RF carrier device having the same drift shown in FIG. 6. The UAV starts at approximately [0;−600] x-y point with a height of 150 meters and travels at a relatively slow velocity range of from about 8 to about 18 m/s (i.e., about 20-40 mph).

Figure 11:
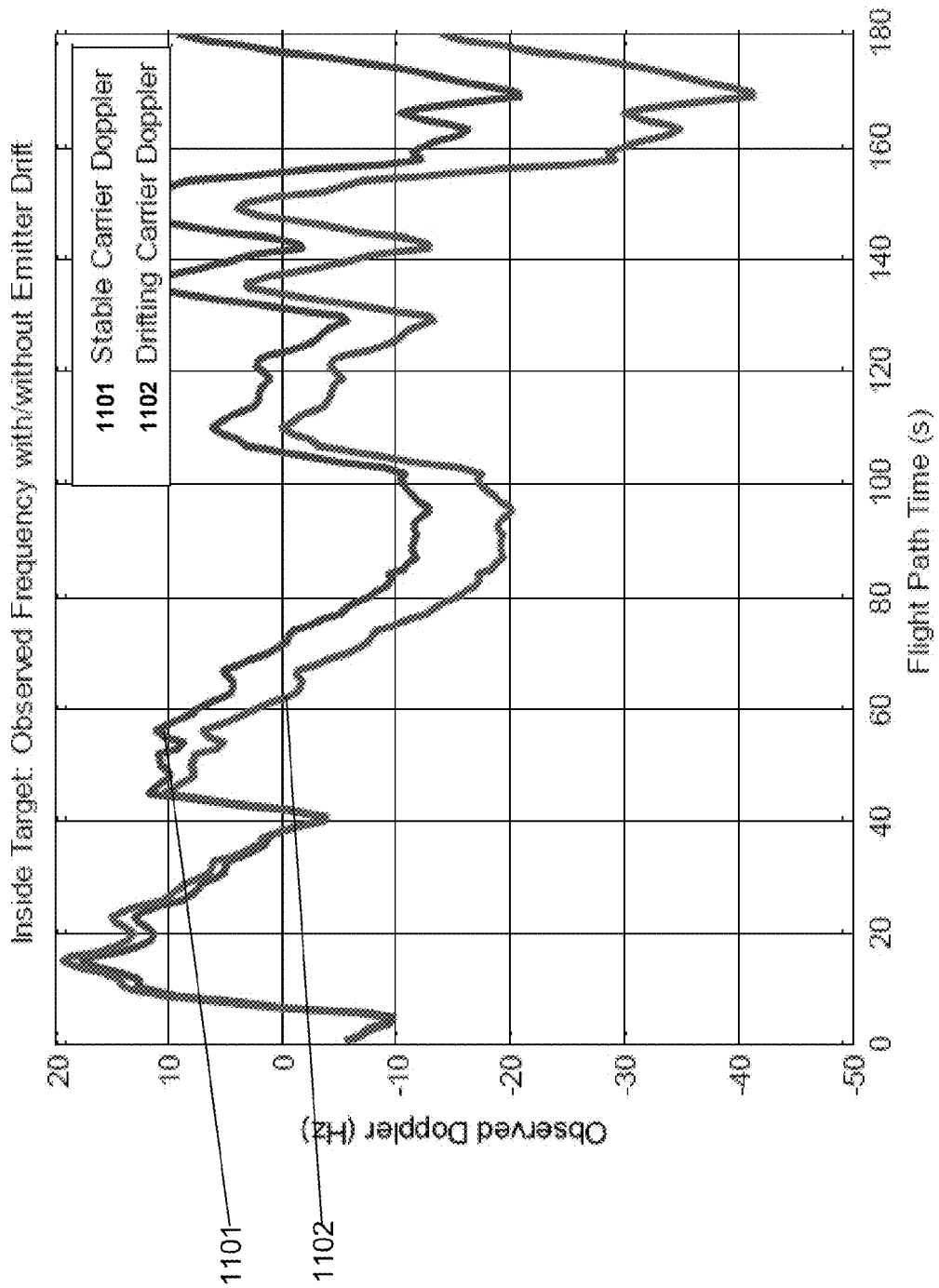
FIG. 11 depicts a graphical comparison of an observed Doppler effect for a stable emitter 1101 to the observed Doppler effect 1102 of an emitter having the carrier frequency drift of FIG. 6.

Referring to FIG. 11, a comparison between the expected Doppler from a stable 500 MHz signal 1101 and the observed Doppler 1102 from the emitter with the drift described in FIG. 6 and geometry of FIG. 10 is shown. It will be appreciated that the Doppler shift for these speeds and geometry ranges from about −20 to about 20 Hz. As shown, the drift changes the observed frequencies, resulting in a less clean signature of where the target is located over the course of the collection.

Figure 12:
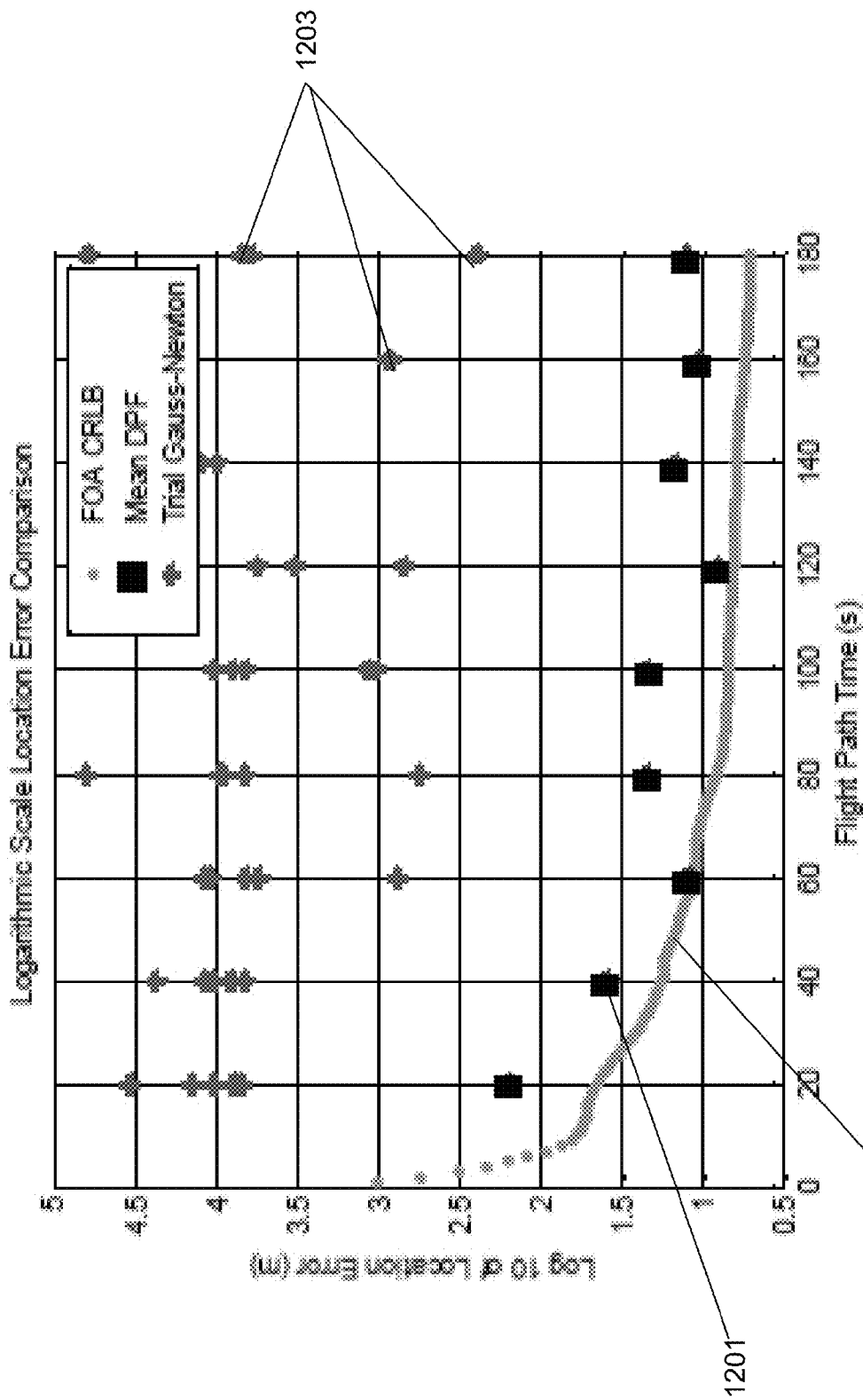
FIG. 12 depicts the error of an exemplary DPF algorithm and a Gauss Newton algorithm on a log 10 scale.

Referring to FIG. 12, the performance of the inventive DPF solution 1201 to the FOA CRLB 1202 given the new target location is shown. Again, the DPF algorithm error 1201 closely approaches the FOA CRLB 1202 with a mean value approaching 10 m accuracy for this target/sensor geometry. In fact, it will be appreciated that the preferred placement of the target inside the flight path dropped the expected error performance from about 30 meters to less than about 10 meters.

The Gauss Newton error 1203 is shown for individual trials. As shown, the Gauss Newton solution 1203 becomes trapped in local minima very far from the actual solution, while the DPF solution does not. These results demonstrate the capability of the particle filter approach to provide a robust, accurate FOA geolocation solution even for cases with substantial nonlinear emitter carrier drift.

Example 3

Figure 13:
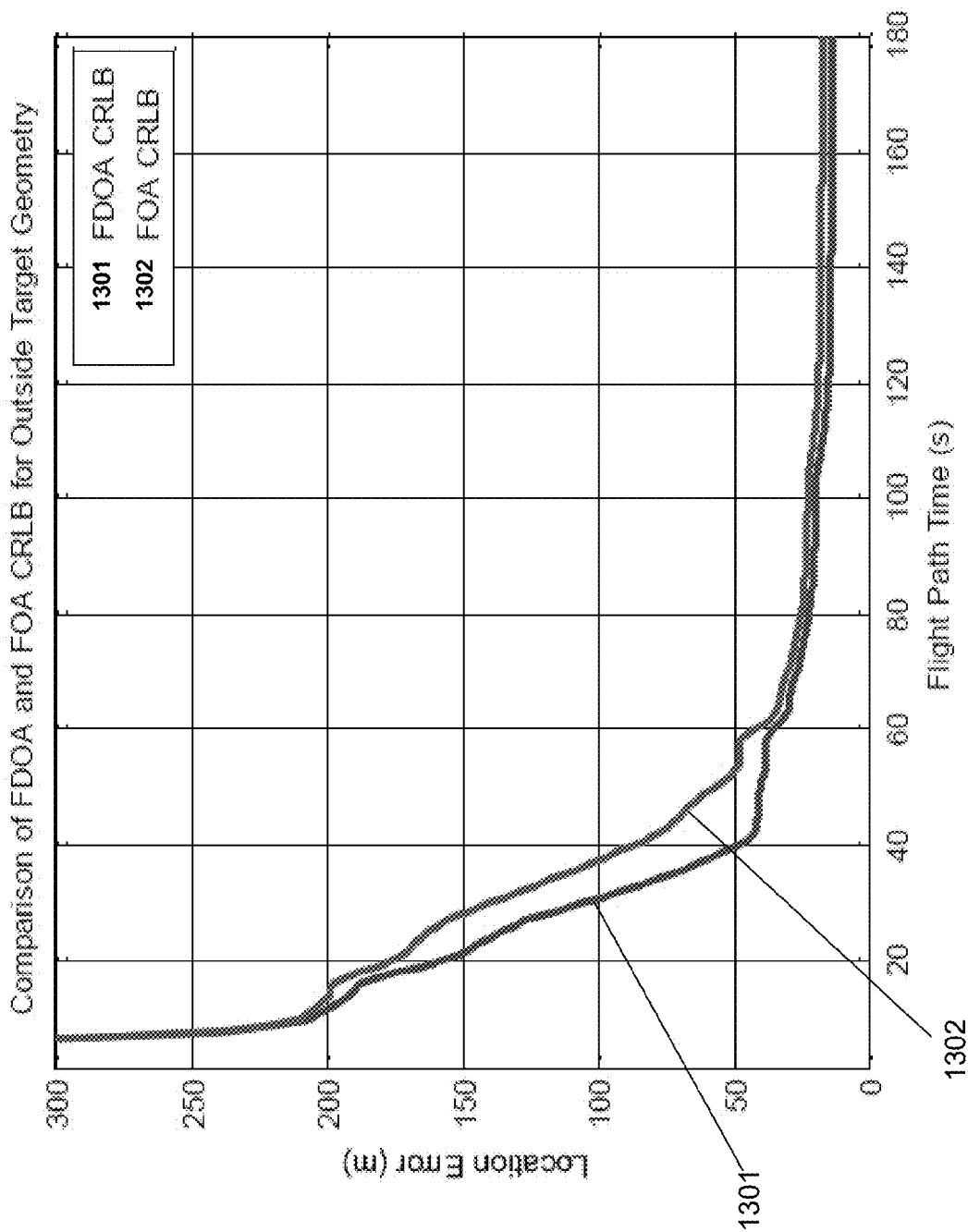
FIG. 13 depicts a graphical comparison of FDOA CRLB using multiple platforms to a FOA CRLB employing a single platform.

Finally, FIG. 13 compares the best potential performance of the two-sensor FDOA method 1301 to the single-sensor FOA method 1302 by comparing their respective CRLBs. As shown, the geometry was the same as described in FIG. 5, except that the FDOA required a second collector placed at the location of [600;−600; 0]. Both bounds assumed a measurement error variance of 1 Hz². The results show that FDOA converges slightly faster, but that the performances of the two techniques at the end of the three minute collection are roughly comparable. Note also that the bounds assume that both FDOA sensors have absolute frequency measurements precise to within a Hz.

Unless specifically stated otherwise as apparent from the above discussion, it is appreciated that throughout the description, discussions utilizing terms such as "processing" or "computing" or "calculating" or "determining" or "displaying" or the like can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but not limited to, any type of disk including optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein may be described as software executed on at least one computer or server, though it is understood that embodiments can be configured in other ways and retain functionality. The embodiments can be implemented on known devices such as a personal computer, a special purpose computer, cellular telephone, personal digital assistant ("PDA"), a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

I claim:

1. A method of determining a location of a radio frequency (RF) emitter using an RF receiver located on a single moving platform, the method comprising:
   A. receiving, by the receiver, an RF signal transmitted by the emitter over a period of time;
   B. measuring, by the receiver, frequency of arrival (FOA) data of the RF signal over the period of time, the FOA data comprising a Doppler-shifted frequency of the emitter, a location of the receiver, and a velocity of the receiver;
   C. determining an estimate of a frequency of the emitter based on the measured FOA data and an estimate of the location of the emitter, wherein the estimated frequency of the emitter includes an estimate of a frequency drift and further wherein the estimate of the frequency of the emitter is calculated with a particle filter which preferentially weights particles having a frequency drift that best corresponds to a model of an expected emitter frequency drift;
   D. resampling the weighted particles; and
   E. determining an updated estimate of the location of the emitter based on the estimate of the frequency of the emitter.

2. A method according to claim 1 further comprising measuring initial FOA data over an initial time period and calculating the estimate of the location of the emitter by modeling a region of interest with a plurality of particles.

3. A method according to claim 2, wherein each particle represents a possible location of the emitter and is associated with a frequency drift conditioned on the location and the initial FOA data.

4. A method according to claim 2, wherein each particle represents a possible frequency estimate and is associated with a location of the emitter conditioned on the frequency estimate and initial FOA data.

5. A method according to claim 2, wherein the estimate of the location of the emitter is based on a priori information or spread uniformly out in a grid-like fashion.

6. A method according to claim 1, wherein the model is a process model of a localized extended Kalman filter.

7. A method according to claim 1, wherein the model is a parametric fit to the estimated frequency drift.

8. A method according to claim 1, wherein the updated estimate of the location of the emitter is determined based on a covariance of the resampled particles.

9. A method according to claim 1 comprising:
   receiving, by the receiver, a second RF signal transmitted by the emitter over a second period of time;
   repeating step C with the updated estimate of particle location to calculate an updated estimate of a frequency; and
   repeating step D with the updated estimate of the frequency of the emitter.

10. The method of claim 1, wherein the platform is an aerial vehicle.

11. The method of claim 1, wherein the one or more of the group consisting of FOA-DOT, FOA-DOT-DOT, FDOA, and D-FDOA are used to calculate the updated estimate of the location of the emitter.

12. A system for determining a location of a radio frequency (RF) emitter comprising:
   a receiver located on a platform, the receiver adapted to receive an RF signal transmitted by an emitter over a period of time; and
   a processor in communication with the receiver adapted to:
      measure frequency of arrival (FOA) data of the received RF signal over the period of time, the FOA data comprising a Doppler-shifted frequency of the emitter, a location of the receiver, and a velocity of the receiver;
      determine an estimate of a frequency of the emitter based on the measured FOA data and an estimate of the location of the emitter, wherein the estimated frequency of the emitter includes an estimate of a frequency drift and further wherein the estimate of the frequency of the emitter is calculated with a particle filter which preferentially weights particles having a frequency drift that best corresponds to a model of an expected emitter frequency drift;
      resample the weighted particles; and
      determine an updated estimate of the location of the emitter based on the estimate of the frequency of the emitter.

13. A system according to claim 12 wherein the processor is further adapted to measure initial FOA data over an initial time period and calculate the estimate of the location of the emitter by modeling a region of interest with a plurality of particles.

14. A system according to claim 13, wherein each particle represents a possible location of the emitter and is associated with a frequency drift conditioned on the location and the initial FOA data.

15. A system according to claim 13, wherein each particle represents a possible frequency estimate and is associated with a location of the emitter conditioned on the frequency estimate and initial FOA data.

16. A system according to claim 13, wherein the estimate of the location of the emitter is based on a priori information or spread uniformly out in a grid-like fashion.

17. A system according to claim 12, wherein the model is a process model of a localized extended Kalman filter.

18. A system according to claim 12, wherein the model is a parametric fit to the estimated frequency drift.

19. A system according to claim 12, wherein the updated estimate of the location of the emitter is determined based on a covariance of the resampled particles.

20. A system according to claim 12 wherein:
the receiver is further adapted to receive a second RF signal transmitted by the emitter over a second period of time; and
the processor is further adapted to:
repeat step C with the updated estimate of particle location to calculate an updated estimate of a frequency; and
repeat step D with the updated estimate of the frequency of the emitter.

21. The system of claim 12, wherein the platform is an aerial vehicle.

22. The system of claim 12, wherein the processor employs one or more of the group consisting of FOA-DOT, FOA-DOT-DOT, FDOA, and D-FDOA to calculate the updated estimate of the location of the emitter.

23. A system according to claim 12 further comprising the RF emitter.

24. A system according to claim 12, wherein the processor is located on-board the platform.

25. A system according to claim 12, wherein the processor is located external to the platform and is in communication with the receiver via a network.

* * * * *